Figure 1:
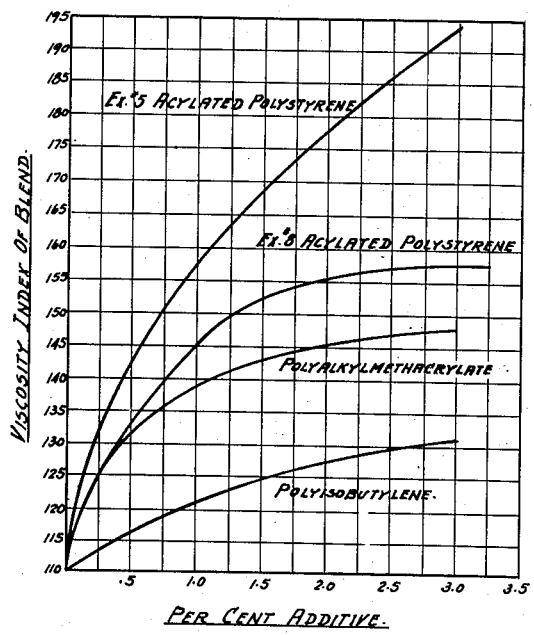

June 16, 1953  J. M. BUTLER  2,642,398

ACYLATED POLYSTYRENE

Filed Feb. 26, 1947

VISCOSITY INDEX VS. PERCENT ADDITIVE IN A
MID-CONTINENT SOLVENT REFINED LUBRICATING OIL.

VISCOSITY @ 210°F VS. VISCOSITY @ 100°F FOR
VARIOUS ADDITIVES AT DIFFERENT
CONCENTRATIONS IN A MID-CONTINENT SOLVENT
REFINED LUBRICATING OIL.

JOHN M. BUTLER
INVENTOR

BY: Herbert Chase

Patented June 16, 1953

2,642,398

UNITED STATES PATENT OFFICE 2,642,398

ACYLATED POLYSTYRENE

John Mann Butler, Dayton, Ohio, assignor to Monsanto Chemical Company, St. Louis, Mo., a corporation of Delaware Application February 26, 1947, Serial No. 731,083

18 Claims. (Cl. 252—52)

The present invention relates to new and improved polymeric products. The main object of the invention is to provide acylated polystyrene as a material of general utility in coating compositions, adhesives and lubricants.

Another object of the invention is to provide lubricating compositions having improved temperature-viscosity properties, commonly expressed as viscosity index. It is an object, in addition, to secure viscosity index compositions of a range beyond that possible with prior art lubricating compositions.

Another aspect of the invention is to provide an acylated polystyrene which may be used in mineral oils to secure the advantages of superior viscosity index properties in certain types of lubricants which could not be ameliorated by the prior art materials.

It is a further object of the invention to make available lower-grade base oils for improvement to the high viscosity index range, thereby providing a greater variety of base stocks suitable for manufacture as superior grade lubricants. This also makes available for lubricating purposes the less-paraffinic types of hydrocarbon oils characterized generally by a low viscosity index.

Another aspect of the invention is to combine the functions of viscosity index improvement and pour point depression so as to make available a single substance having these dual functions to be used as an adjuvant for lubricating compositions to secure a marketable product at a reasonable price, and by the use of simple and inexpensive equipment.

The prior art has recognized that resinous materials may be modified so as to make them more soluble by chemical changes such as alkylation. An example of this type of material is the series of alkylated phenolic resins which, because of such treatment, are rendered oil-soluble so that they may be used in paints and the like. The prior art has also recognized that alkylation of polystyrene resins will increase the solubility of these resins in mineral oils, and that the resulting solution of alkylated polystyrene in a solvent such as mineral lubricating oil will have a higher viscosity than that of the solvent.

However, it is new to bring about the result of viscosity index improvement by means of an acylated polystyrene. Furthermore, the added physical effect of pour point depression has not heretofore been recognized as being susceptible of attainment by means of any polystyrene derivatives, particularly not by acylated polystyrenes.

I prefer to use as the base polymer in making lubricating compositions, polystyrene, either as a mixture or as a fraction of relatively narrow molecular weight. The molecular weight may vary in the range of 3,000 to 1,000,000 with particular adjuvant compositions utilizing either relatively low molecular weight or high molecular weight fractions.

The molecular weight of the polymeric starting material, polymeric styrene, is determined by any standard method such as that of Staudinger, which makes use of the change in viscosity resulting from the addition of the polymer to a reference solvent. The application of the Staudinger method in this relationship is discussed in Ellis, Chemistry of Synthetic Resins, vol. I, p. 73.

Acylation may be performed upon the polymeric resin by making use of the acyl halides of the desired aliphatic acids. I have found that the halides of aliphatic mono-carboxylic acids having more than 10 carbon atoms, and preferably from 10 to 20 carbon atoms may be used in the present invention. The acid chlorides of fatty acids having from 8 to 20 carbon atoms in the molecule are particularly convenient and readily available and serve as a convenient source of the acyl group. However, the aliphatic acids per se may also be utilized in the present invention. Mixtures of mono-carboxylic acids or of acyl halides may be used as desired, and acids obtained from sources such as the oxidation of aliphatic hydrocarbons and from the Fischer-Tropsch process and its variations are readily adaptable for the present procedure. Reference to an acyl group contemplates carboxylic acids generally as represented by the molecular structure R—C(O)— such as in the case of the acids per se, R—C(O)—OH, and also the acyl halides, R—C(O)Cl, or the corresponding fluorides, bromides or iodides. Here R may have a chain length of at least six carbon atoms, although the preferred range is 8-20 carbon atoms. The carbon chain which is utilized in the acylation step may also be branched or substituted such as by the provision of methyl, ethyl, propyl, butyl, pentyl, hexyl, and heptyl chains or cyclo radicals at any part of the acyl group. The modifications have been found to be useful in the present invention. However, the term acyl does not refer to sulfur-organic groups having an acid radical through the sulfur, e. g. sulfonyl, which have been incorrectly designated as acyl radicals.

As a catalyst in the acylation operation I may use aluminum chloride, particularly when operating with acid halides. Another catalyst which I may utilize is hydrofluoric acid which has been found particularly efficacious in the case of the aliphatic acids per se. The reaction may be described as a Friedel-Crafts condensation, for which the typical Friedel-Crafts catalyst may be employed in the present process. The products obtained in the acylation have excellent solubility in lubricating oils, and exhibit the properties of both viscosity index improvement and of pour point depression.

While it has been customary in the past to evaluate the temperature-viscosity effect of additives by reference to what is known as "viscosity index" (V. I.) more recently it has come to be realized that the viscosity index factor is not an accurate measure of the viscosity properties of the lubricating oils. Recent articles by Hardiman and Nissan, Journal of the Petroleum Institute, 31, 255 (1945) and Larron and Schwader, Oil and Gas Journal, July 15, 1943, page 49, point out modifications of the V. I. system. The prior art has recognized that with a poor V. I. improver it is necessary to add so much polymer to the oil to obtain a suitable V. I. that the viscosity was increased beyond that desirable. Thus by adding a poor V. I. improver to a given base stock, say, an SAE-20 oil it was possible by the addition of sufficient polymer to obtain a desirable and marketable V. I. product. However, in the case of the poor V. I. improver, it is necessary to add so much polymer to the oil that the viscosity is increased to the point where the SAE rating is considerably higher than 20. On the other hand, a good viscosity index improver retards the high temperature, thinning-out of the oil without too great an increase in the viscosity of the oil at normal temperatures. It is also know that in the high V. I. ranges, e. g., above 140 V. I., the V. I. scale often fails to reflect the quality of the oil blend.

With the realization that the V. I. concept failed to give a true picture of the viscosity-temperature relationship, several other methods have lately been proposed. These are:

(a) By determining the viscosity at two different temperatures (such as 100° F. and 210° F.) of both the base oil and the polymer blend, it is possible to calculate the increase in viscosity due to the presence of the dissolved polymer at these temperatures. From the increase in viscosity it is then possible to calculate the percentage increase of viscosity over that of the base oil. This percentage increase is essentially the specific viscosity. The most desirable polymer is one which gives a higher per cent increase in viscosity at the higher temperature (210° F.) than at the lower temperature (100° F.). This is the same as saying that the ratio here defined should be as high as possible. This method will be known herein as the "ratio" method.

(b) Another method for evaluating the quality of polymer additives to lubricating oils is to determine the slope of the temperature-viscosity curve. This method of evaluating the temperature-viscosity properties of lubricating oils is described in ASTM Specification D341-44, to be found in the 1944 ASTM Standards, part 3, p. 2847. It will be realized by those skilled in the art that as far as the "slope" of the temperature-viscosity curve is concerned, the desirable slope is one having as low a numerical value as possible. This method will be referred to herein as the ASTM "slope" method.

Because of the generally prevalent usage of viscosity index, the present application also gives the viscosity index values.

In the drawing—Fig. 1, the curves express the relationship of the viscosity index as related to the amount of adjuvant employed. It may be seen that the present acylated polystyrene improvement agents permit the attainment of a higher level of viscosity index values than may be obtained with other type compounds. For example, the present compositions are considerably improved in viscosity index over those which may be secured by the use of prior art materials, such as the polyalkyl methacrylates or polyisobutylene.

Another function accomplished by the acylated polystyrene adjuvants is that of pour point depression. While this is not a major factor in the ordinary technical hydraulic oils which are selected from generally low pour point stocks, this function is of major importance in lubricants such as are intended for automotive and diesel engine applications. Hence, the dual function accomplished of pour point depression simultaneously with viscosity index improvement enables a single compound to supply two of the fundamental requisites which must be imparted to a base oil to secure a marketable lubricant.

Furthermore, the extraordinary efficacy of the acylated polystyrene adjuvants allows the viscosity index to be raised to values considerably beyond the range of possibilities of prior art compounds. Consequently, marketable lubricating compositions may also be compounded from lower grade base stocks such as are more commonly available and which may be required to be more extensively used in the future. In addition, the use of the compounds of the present invention makes it possible to simplify and reduce the extent of treating operations such as solvent extraction of the base stocks and hence provides for a more economical production of finished lubricants.

Another factor accomplished by my new materials is that high V. I. oils may be made with little change in other physical properties. Thus, there is less thickening produced, and it is not necessary to start with as low a viscosity of base stock to accomplish a particular result. Consequently, higher flash point oils may be used, which results in a safer lubricant for industrial applications.

The equipment necessary in carrying out the invention is relatively simple and in the final compounding enables the production of finished oil by the addition of a single adjuvant to accomplish a dual function with consequent simplification of testing and blending to adjust the specification constants to a marketable range.

In the lubricant modifying embodiment of the present invention I employ an oil base of the type best suited for the particular use for which the ultimate composition is designed. When the lubricating compositions of my invention are designed for the lubrication of automobiles, airplane engines, diesel engines and the like, the oil base will, of course, preferably consist of a refined mineral lubricating oil having a lubricating viscosity for the particular point of application. In other words, a heavier gear oil may be used for the lubrication of gears and generally a lighter oil will be used in the crankcase, while a conventional hydraulic oil is used for pressure transmittive applications. The oil base may also contain other adjuvant materials, since the instant polymers are generally compatible with the same in the amounts usually used.

The polystyrene employed in the present invention may be of a low degree of polymerization such as 3,000 molecular weight or may range as high as 1,000,000 or higher. The upper limit is determined principally by the permissible breakdown due to shear during use of the final oil blend. A preferred range for general use is of the order of 3,000 to 80,000 molecular weight. However, the present invention is to be distinguished from the use of acylated monomeric styrene. Such a compound has been described in the art, but is of no value for the present purposes of lubricating oil modification. It is essential in order to obtain the present viscosity index characteristics and pour point depression, that the styrene be previously polymerized and that the acylation operation be effected upon such polystyrene. Hence, the present invention is sharply distinguished over acylated styrene which is subsequently polymerized, since such polymers do not function in the present relationship of lubricant modification.

The polymeric compositions employed as adjuvants and in coating compositions in the present invention are based upon polymers derived from styrene monomers. I have found that of the various types of monomeric structural units which are available in this field, that it is essential that the recurring elements of the polymer chain shall be

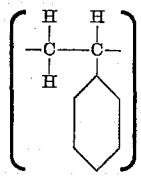

units, which, when acylated, shall provide acyl groups bound directly by ketonic linkages to aromatic nuclei which in turn are linked to the recurring ethylene radicals. The theory of this configuration in the present successful applications is not fully understood, but it is preferable that acyl groups and the aromatic group shall not be elements of the recurring groups of the polymeric chain, but shall be bound to the chain of ethylene groups constituting the linked units. In practice, such a result is achieved by first making a polymer from monomeric styrene, and then utilizing a polymer of the desired molecular weight for acylation.

The product obtained by acylating a polymeric styrene of the desired molecular weight differs markedly from the composition resulting from a polymerization of acylated monomeric styrene, since it is only the former which exhibits the properties of the present invention with respect to the functions of viscosity index improvement and pour point depression in lubricating oil solutions.

The present method also avoids the difficulty of undesirable side reactions which occur when a monomeric styrene is acylated. Such difficulties include the polymerization and cyclization of the monomer induced by the aluminum chloride catalyst to give a very low molecular weight heterogeneous material, undesirable in the present relationship. Another possible reaction is that the double bond of the monomers will alkylate with aromatic nuclei of the monomeric or polymeric intermediates to give still other low molecular weight end products. Even more dangerous in a lubricating additive would be the loosely bound hydrogen-chloride addition compound of monomeric styrene and hydrogen chloride, which latter is released from the acylation reaction. Applicant's invention overcomes all such difficulties because the acylation step is performed upon styrene which has already been polymerized to the degree desired, by virtue of which the ethylenic double bonds are no longer free to react.

The polystyrene to be acylated may be dissolved in any suitable solvent such as acetylene dichloride or other inert halogenated aliphatic or aromatic compounds. Suitable solvents for carrying out the acylation are the following nitro and/or chloro paraffin and aromatic compounds:

Ethylene dichloride
Acetylene dichloride
Nitrobenzene
Dichlorobenzene
Carbon tetrachloride
Mono-chlorobenzene
Carbon disulfide
Chloronitromethane It is often desirable to have present a small amount of an organic nitro compound such as nitromethane or nitrobenzene to prevent depolymerization of polystyrene which may be a factor to be considered when using aluminum chloride as a catalyst.

Polystyrene of a suitable molecular weight may be prepared by polymerizing monomeric styrene under conditions of temperature and catalyst concentration to give the desired molecular weight. The effect of polymerization conditions upon molecular weight is known to those skilled in the art, see for example, Ellis, Chemistry of Synthetic Resins (1935) pages 72 et seq. and 235–239. If polystyrene of higher molecular weight than desired for the present purpose is available, it may be reduced in molecular weight by milling upon hot rolls until a test portion shows that the desired average molecular weight of the range has been reached. The milled product is then acylated as described above.

High molecular weight polystyrene may also be treated in solution at room temperature or at a somewhat higher temperature with aluminum chloride in order to decrease the molecular weight of the desired polystyrene. Such treatment is continued until the desired molecular weight has been reached. Merely as an example of the rate at which aluminum chloride decreases the molecular weight of polystyrene, the following experiment is described: 10 g. of polystyrene having an average molecular weight of 90,000 was dissolved in 190 g. of ethylene dichloride, 2 g. of aluminum chloride was added and the solution stirred at room temperature for 6½ hours. The solution was then washed with dilute HCl which served to destroy the depolymerizing action of the AlCl₃, after which the depolymerized polystyrene was recovered in the usual way. A determination showed that the polymer had been reduced to a 12,000 average molecular weight. For the purpose of the present invention such a polymer having a molecular weight of 12,000 is considered fairly low in regard to the viscosity index function, since the most widely useful viscosity index values are secured by compositions having a molecular weight of the order of 25,000 to 80,000. Hence, a suitable product may be obtained for a particular application by restricting the treatment to a shorter period of time whereby the average molecular weight within the range of 25,000 to 80,000 may be obtained. By utilizing the depolymerizing action of aluminum chloride in this way it is possible to start with a polystyrene of a higher molecular weight than 80,000 and to arrive finally at a polystyrene having a molecular weight within the desired range for acylation.

It has been found, moreover, that it is not necessary to destroy the aluminum chloride catalyst after a depolymerization treatment has been utilized to provide the desired starting material, but this catalyst may also serve as the acylation catalyst. If desired, a depolymerization inhibitor such as an organic nitro compound may also be added to the solution of polystyrene containing aluminum chloride. The depolymerizing action of the latter may be inhibited without, however, destroying its effectiveness as an acylation catalyst. Thus, upon the addition of the depolymerization inhibitor to the polystyrene solution the depolymerizing action of the aluminum chloride is arrested, and the acylating agent may then be added and the acylation continued to the desired degree without any further break-down of the polystyrene to lower molecular weight material. By working in this way an economy of the material, operating time and equipment may be realized.

The particular acylating agent such as the aliphatic acid chlorides, acid anhydrides, or acids per se, having from 8 to 20 carbon atoms may be utilized as single fractions or in mixtures to provide variations in the pour point depressive quality. A preferred range of particular utility is that of 12 to 18 carbon atoms. Reference is had to Tables I and II which summarize test results made upon certain typical materials of the present invention as prepared in accordance with the methods given in the representative examples below. However, all the acyl radicals from 8 to 20 carbon atoms in length provide the effect of viscosity index improvement and, in general, possess pour point depressive action.

Figure 2:
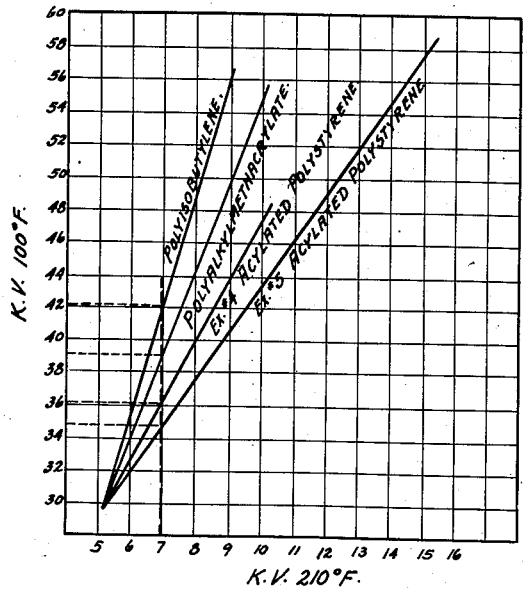

The amount of acylated polystyrene which I use in lubricating oils varies from 0.1 to 10.0% by weight and depends in magnitude upon the type of final lubricant desired. Thus, as shown in Fig. 1 of the accompanying drawing the viscosity index obtainable increases with the amount of adjuvant used, and at the higher limits tapers off so that the greatest increment of V. I. improvement occurs with the lower concentrations of adjuvant. Figure 2 shows further the superior qualities of the modified lubricants as revealed by the slope method of plotting the viscosities of blends utilizing the present polymers in comparison with prior art materials.

The acylation may utilize sufficient acyl charge stock to react in substantially stoichiometric proportions with the aromatic recurring units of the styrene polymer. However, smaller proportions of the acyl substituent are also effective and may be desired in some relationships. In general, oil solubility of the acylated polymer is increased as the degree of acylation increases. I can react the acyl groups in 0.1 to 1.0 proportion to the recurring units of the polymer chain as defined above. Such control may be effected by modifying the proportions, and also the reaction velocity, such as by operating at higher or lower temperatures or even without the addition of any heat.

TABLE I

*Data for blends having K. V.=7 cs. @ 210° F.*

[Base Oil—Mid-Continent—Solv. Ref.]

| | Poly-Iso-butylene | Poly-Alkyl-methacrylate | Acylated Polystyrene | | |
|---|---|---|---|---|---|
| | | | Ex. #1 | Ex. #4 | Ex. #5 |
| K. V. @ 100° F. (cs.) | 42.6 | 39.6 | 36.4 | 36.4 | 34.8 |
| Viscosity Index | 128.8 | 137.0 | 148.0 | 148.0 | 152.8 |
| $Nsp$,[1] 210° F | 0.373 | 0.373 | 0.373 | 0.373 | 0.373 |
| $Nsp$, 100° F | 0.432 | 0.333 | 0.226 | 0.226 | 0.171 |
| $Nsp$, 210° F./$Nsp$, 100° F | 0.864 | 1.12 | 1.65 | 1.65 | 2.16 |
| ASTM Slope | 0.659 | 0.635 | 0.618 | 0.618 | 0.604 |

[1] $Nsp = \dfrac{\text{viscosity blend} - \text{viscosity oil}}{\text{viscosity oil}} - 1$

TABLE II

*Test data on products*

1% SOLUTIONS IN A 20° F. POUR MID-CONTINENT SOLV. REF. BASE

[Vis. Oil at 100° F=29.7; Vis. Oil at 210° F=5.11]

| Ex. No. | 100° F. Vis. (cs.) | 210° F. Vis. (cs.) | V. I. | ASTM Slope | $Nsp$, 210° F./$Nsp$, 100° F. | Rodessa (20° F. Pour), Pour Point, °F. | Mid-Continent (20° F. Pour), Pour Point, °F. |
|---|---|---|---|---|---|---|---|
| 1 | 34.84 | 6.65 | 145.6 | .630 | 1.74 | | |
| 2 | 35.83 | 6.73 | 147.5 | .628 | 1.54 | +10 | |
| 3 | | | | | | −5 | |
| 4 | 35.06 | 6.56 | 142.8 | .635 | 1.57 | +5 | −10 |
| 5 | 36.90 | 7.83 | 157.2 | .564 | 2.18 | | |
| 6 | | | | | | | −15 |
| 7 | | | | | | | −15 |
| Polyisobutylene 1% | 32.90 | 5.65 | 116.1 | .695 | | +20 | +20 |
| Polyisobutylene 3% | 45.03 | 7.44 | 131.3 | .648 | | +20 | +20 |
| Polyalkylmethacrylate | 40.23 | 7.18 | 136.5 | .645 | 1.14 | +20 | +20 |

The invention will be better understood from a consideration of the following examples which are given for illustration only.

*Example 1*

Polystyrene having an average molecular weight of 68,000 as determined by the Staudinger viscosity method was acylated using the method conventional for Friedel-Crafts reactions employing a flask with a sealed stirrer. The charge was 100 g. of ortho-dichlorobenzene and 8 g. of nitrobenzene. This was stirred at 40–45° C., during which time 17.3 g. of anhydrous aluminum chloride and 27.4 g. of lauroyl chloride was added. Stirring was continued at 50–55° C., while a solution of 10.4 g. of polystyrene in 100 g. of ortho-dichlorobenzene was added over a period of 15 minutes. Stirring was continued at this temperature until a test showed the product to be soluble in lubricating oil, an overall period of about 4 hours. The solution was then washed with an equal quantity of 20% hydrochloric acid and was then washed with water until the wash water was no longer acid to Congo red paper. The product was precipitated by adding the solution to denatured alcohol in a high speed blender. The precipitated polymer was then dried for 24 hours in a vacuum oven at 60° C.

*Example 2*

The procedure of Example 1 was repeated, except that no nitrobenzene was used in the solvent. The charge comprised 5.2 g. of polystyrene (68,000 molecular weight), 9.3 g. of aluminum chloride and 16 g. of lauroyl chloride.

*Example 3*

The use of lower molecular weight polystyrene is shown in this example, in which 5.2 g. of polystyrene having a molecular weight of 4,000 was dissolved in ortho-dichlorobenzene and was reacted with 16 g. of lauroyl chloride, employing 9.3 g. of aluminum chloride catalyst. However, polystyrene of 3,000 molecular weight may also be employed in this relationship, and may be the product of direct polymerization, or may be produced by depolymerization with aluminum chloride, in which case the same aluminum chloride may be employed as the catalyst in subsequent acylation.

*Example 4*

The use of the myristoyl radical is illustrated in this example, in which 100 g. myristoyl chloride was reacted with 24 g. of polystyrene. The polystyrene had a molecular weight of 68,000 and was introduced as a 10% solution in ortho-dichlorobenzene. The catalyst was 60 g. of aluminum chloride and the solvent used to carry out the reaction was 1,400 g. of ortho-dichlorobenzene. The reaction time was 18 hours at 55° C. at the conclusion of which it was found that the product was oil soluble.

*Example 5*

An intermediate molecular weight polystyrene was employed in this example. 20 g. of stearoyl chloride was used in 200 g. of ortho-dichlorobenzene. The reaction was carried out with 9 g. of aluminum chloride to acylate 10.4 g. of polystyrene having a molecular weight of 24,000. The polystyrene was dissolved in 94 g. of ortho-dichlorobenzene. The precipitation of the product was carried out in the manner described in Example 1.

*Example 6*

Application of a mixture of acyl constituents is shown in this example. The charge was 20 g. of the mixed acid chlorides obtained from cocoanut oil fatty acids which was reacted with 5.2 g. of polystyrene having a molecular weight of 68,000. The solvent was ortho-dichlorobenzene, the catalyst aluminum chloride, and the finishing operations and precipitation were carried out as in Example 1.

*Example 7*

Myristic acid per se was employed as the acylating agent. The entire charge of 3.1 g. of polystyrene (68,000 molecular weight) dissolved in ortho-dichlorobenzene was reacted with 10.3 g. of myristic acid employing 55 g. of anhydrous hydrofluoric acid as a catalyst. The total solvent was 110 g. of ortho-dichlorobenzene. In this case the mixture was heated in a rocking autoclave at about 200° C. for 65 hours. A dark colored tarry polymer was isolated and was prepared for testing. Other preparations made with hydrofluoric acid as a catalyst showed it to be applicable to the various polymers of styrene and with acids and acid halides having from 8 to 20 carbon atoms.

*Example 8*

The employment of reduced pressure is shown in this example. The charge was 5.2 g. of polystyrene (molecular weight 68,000) in 250 g. of ortho-dichlorobenzene which was reacted with 14 g. of lauroyl chloride in the presence of 8.65 g. of aluminum chloride. The reaction was carried out at about 30 mm. mercury pressure over a period of 4 hours at 45° C. The use of a vacuum was found to facilitate removal of the HCl formed during the reaction.

*Example 9*

The use of an acylation stock comprising a branched chain compound is shown by this example. A solution of 200 g. of ortho-dichlorobenzene and 10 g. of nitrobenzene was stirred at room temperature in a 3-necked flask fitted with a stirrer, calcium chloride tube and dropping funnel. 30 grams of aluminum chloride (0.235 mole) and 33 g. of 2-ethylhexanoyl chloride (0.205 mole) were added. The temperature was raised to 45° C. and 104 g. of a 10% solution of polystyrene having a molecular weight of 68,000 was added in the form of a solution in ortho-dichlorobenzene. The polystyrene was added to the reaction mixture over a period of 10 minutes. Stirring at 45–50° C. was continued for two hours. The reaction mixture was washed and precipitated as outlined in the previous examples. This yielded 20 g. of fluffy, white or slightly yellow polymer shreds. This material at higher temperatures showed prominent tackifying and adhesive properties.

*Example 10*

The use of a carbocyclic compound is brought out in this example. A solution of 200 g. of nitrobenzene and 22.5 g. of aluminum chloride (0.17 mole) was stirred at room temperature and 30 g. of ω-cyclohexane caproyl chloride (0.138 mole) was added. The temperature was raised to 50° C. and 73 g. of a 10% solution of 68,000 molecular weight polystyrene (0.07 mole) in ortho-dichlorobenzene was added during a 15 minute period. Stirring and heating at 50° C. was continued for 20 hours. The resultant polymer was washed and precipitated to yield 17 g. of a tough, rubbery polymer having slight solubility in lubricating oils and adaptable for adhesive applications.

*Example 11*

The acylation of a relatively high molecular weight polystyrene is shown in this example. A solution of 50 g. of ortho-dichlorobenzene and 35 g. of nitrobenzene was stirred at room temperature in a 3-necked flask fitted with a stirrer, calcium chloride tube and dropping funnel. There was added 17.3 g. of aluminum chloride (0.13 mole) followed by 31 g. of technical myristoyl chloride (0.125 mole). The temperature was raised to 45° C. and 415 g. of a 2% solution of polystyrene molecular weight 730,000 (0.08 mole) in ortho-dichlorobenzene was added by way of the dropping funnel over a 20 minute period. The temperature rose to 60° C. and it was observed that a steady evolution of hydrogen chloride gas took place. Stirring at 60° C. was continued for two hours. The reaction mixture was then quenched with an excess of 15% HCl in a high speed mixer and was then washed free of acid by means of water. The resulting polymer syrup was precipitated by dropping a thin stream into denatured alcohol which was being stirred in a high speed mixer. The precipitated myristoyl polystyrene was dried at 60° C. in vacuo. This yielded 20 g. of a tan-colored, tough, rubbery polymer soluble in lubricating oil and particularly adapted for use as a tackiness and string-promoting agent in greases. It has also been found that polystyrene having an average molecular weight to the range of about 1,000,000 may be utilized in the same relationship.

The above samples were prepared for testing as adjuvants by blending with an oil base to secure products having a kinematic viscosity of 7 cs. at 210° F. This treated oil was then tested to determine the viscosity at 100° F., from which data the viscosity index, the specific viscosity and the ASTM slope could be determined. Table I summarizes certain of the data obtained with the products produced in the above examples when employed as adjuvants in a Mid-Continent solvent refined base oil having viscosities of 29.7 cs. at 100° F. and 5.11 cs. at 210° F. The base was adjusted by means of the additive to a kinematic viscosity of 7 cs. at 210° F., and was compared with the prior art materials, e. g., polyisobutylene and polyalkyl methacrylate. Table I shows the viscosity results obtained with a typical oil as modified by the present adjuvants and prior art materials. It will be seen that the old materials give viscosity index values of 128.3 and 137, whereas the new acylated polystyrene gives results of 143 and 152.8. Correspondingly the ASTM slope values also indicate the superiority of the acylated polystyrene as addition agents.

The superior viscosity index products achieved with the acylated polystyrenes together with pour point depression obtained may be seen from this data. Figs. 1 and 2 show graphically the nature of the effect of the new adjuvants in comparison to prior art materials upon the respective properties of viscosity index and specific viscosity. The superior results obtained from acylated polystyrene are obvious from these data.

In addition to the viscosity index improvement characteristics of the present materials, the pour point depressive function was also tested. The expression "pour point" is used herein to mean the pour point as determined by the Standard ASTM method. These results for certain of the above materials are summarized in Table II. The pour point was determined upon a 1% solution of the adjuvant in 20° F. pour point oils, both a Mid-Continent, and a Gulf coast (Rodessa) stock.

The present additives may be employed in such small amounts as to achieve the desired effect, being generally in the range of 0.1–10%. The oil base may also contain other adjuvant materials, since the instant polymers are generally compatible with the same in the amounts usually used.

The acylated polystyrene produced by the method of the present invention is also useful for purposes other than in waxy and other hydrocarbon lubricants. Since the finished polymers have a tacky nature they have been found useful as tackifiers in grease compounding. Here they are particularly useful in preventing drip, and loss of the lubricating qualities of the grease.

The acylated polystyrene of the present invention may also be used as coating compositions of various types, and in particular are valuable in hot-melt coatings. The property of adhesion is also prominently displayed by the acylated polystyrene, so that it may be used in various types of adhesives.

It is not intended that this invention be limited to any of the particular examples which have been given merely for the sake of illustration nor to any theory as to the mechanism of the operation of the invention, but only by the appended claims in which it is intended to claim all novelty inherent in the invention as broadly as the prior art permits.

I claim:

1. A polymeric composition of matter comprising polystyrene having a molecular weight of from 3,000 to 1,000,000 which has been acylated with a monocarboxylic fatty acid chloride having from 8 to 20 carbon atoms in the presence of aluminum chloride as a catalyst.

2. A polymeric composition of matter comprising polystyrene having a molecular weight of from 3,000 to 1,000,000 which has been acylated with a monocarboxylic fatty acid having from 8 to 20 carbon atoms in the presence of hydrofluoric acid as a catalyst.

3. A polymeric composition of matter comprising polystyrene having a molecular weight of from 3,000 to 80,000 which has been acylated with not more than one mole of an aliphatic monocarboxylic fatty acid chloride having from 12 to 18 carbon atoms in the presence of a Friedel-Crafts catalyst.

4. A polymeric composition of matter comprising polystyrene having a molecular weight of from 3,000 to 80,000 which has been acylated with not more than one mole of an aliphatic monocarboxylic fatty acid chloride having from 12 to 18 carbon atoms per mole of recurring unit of said polymer in the presence of aluminum chloride as a catalyst.

5. The process for making polymers which comprises reacting in the presence of a Friedel-Crafts catalyst a polymer in which the recurring units are:

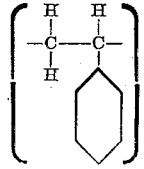

and an aliphatic monocarboxylic fatty acid chloride containing from 8 to 20 carbon atoms, said acid chloride and polymer being reacted in the ratio of not more than one mole of said chloride to each of said recurring units.

6. The process which includes mixing aluminum chloride with a solution of polystyrene having an average molecular weight above 80,000, agitating said solution until polystyrene having an average molecular weight below 80,000 has been formed, adding an organic nitro compound and an acyl fatty acid chloride containing from 8 to 20 carbon atoms to said solution in amount sufficient to acylate said polystyrene by catalysis with the said aluminum chloride and producing a product soluble in mineral oil.

7. A mineral oil containing dissolved therein 0.1% to 10% by weight of polystyrene of average molecular weight between 3,000 and 1,000,000 and which has been acylated with a monocarboxylic fatty acid chloride containing from 8 to 20 carbon atoms, which acid chloride is reacted to the extent of 0.10 to 1.0 mole of said chloride to each of the recurring units of the said polymer.

8. A mineral oil containing dissolved therein 0.1% to 10% by weight of polystyrene which has an average molecular weight greater than 3,000 but less than 80,000 and which has been acylated and combined with an acyl fatty acid chloride having from 8 to 20 carbon atoms in amount of from 0.1 to 1.0 mole of said acyl chloride for recurring unit of the polystyrene.

9. A composition comprising a major proportion of a hydrocarbon oil and a small but pour depressing amount of a product defined in claim 16.

10. A composition comprising a major proportion of a waxy mineral lubricating oil and a pour depressing amount of an acylated polystyrene having a molecular weight of from 3,000 to 80,000 which has been acylated with an acyl fatty acid chloride having from 8 to 20 carbon atoms to impart oil solubility and viscosity index improving properties thereto.

11. A polymerization product obtained by condensing in the presence of a Friedel-Crafts catalyst a polymer in which the recurring units are:

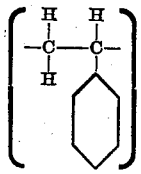

and lauroyl chloride in the ratio of not more than one molecule of said chloride to each of said recurring units.

12. A polymerization product obtained by condensing in the presence of a Friedel-Crafts catalyst a polymer in which the recurring units are:

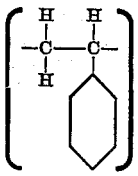

and myristoyl chloride in the ratio of not more than one molecule of said chloride to each of said recurring units.

13. An oil soluble polymerization product obtained by condensing in the presence of a Friedel-Crafts catalyst a polymer of styrene having a molecular weight of from 3,000 to 1,000,000 with a monocarboxylic fatty acid chloride containing from 8 to 20 carbon atoms, said acid chloride being reacted to the extent of 0.1 to 1.0 mole with each recurring unit of the said polymer.

14. The process for improving the quality of a lubricating oil which comprises incorporating therein from 0.1 to 10.0% of polystyrene which has an average molecular weight greater than 3,000 but less than 1,000,000, which polystyrene has been acylated and combined with an acyl fatty acid radical having from 8 to 20 carbon atoms in amount of from 0.1 to 1.0 mole of said acyl radical per recurring unit of said polystyrene.

15. A polymerization product obtained by condensing by carboxylic acylation in the presence of a Friedel-Crafts catalyst a polymer in which the recurring units are solely;

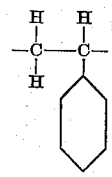

and an acyl fatty acid chloride having from 8 to 20 carbon atoms.

16. A polymeric composition of matter comprising polystyrene having a molecular weight of from 3,000 to 1,000,000 which has been acylated with a monocarboxylic fatty acid chloride having from 8 to 20 carbon atoms, in the presence of a Friedel-Crafts catalyst.

17. The process which includes the aluminum chloride catalyzed acylation of polystyrene with a monocarboxylic fatty acid chloride having from 8 to 20 carbon atoms, while in solution in the presence of a nitro compound.

18. In the process of preparing an acylated polystyrene, the improvement which comprises acylating polystyrene with a fatty acid chloride having from 8 to 20 carbon atoms, in the presence of a nitro aromatic compound and aluminum chloride.

JOHN MANN BUTLER.

References Cited in the file of this patent
UNITED STATES PATENTS

| Number | Name | Date |
|---|---|---|
| 2,033,546 | Ralston | Mar. 10, 1936 |
| 2,072,120 | Mikeska | Mar. 2, 1937 |
| 2,197,709 | Ralston | Apr. 16, 1940 |
| 2,197,712 | Ralston | Apr. 16, 1940 |
| 2,197,713 | Ralston | Apr. 16, 1940 |
| 2,283,236 | Soday | May 19, 1942 |
| 2,393,181 | Mikeska | Jan. 15, 1946 |
| 2,407,087 | Lieber | Sept. 3, 1946 |
| 2,500,082 | Lieber | Mar. 7, 1950 |

OTHER REFERENCES

Price et al.—J. Am. Chem. Soc. 65, 757–9—1943.

Schildkneckht—"Vinyl and Related Polymers"—page 585—1952, Wiley.